(12) United States Patent
Pilluti et al.

(10) Patent No.: US 10,108,191 B2
(45) Date of Patent: Oct. 23, 2018

(54) DRIVER INTERACTIVE SYSTEM FOR SEMI-AUTONOMOUS MODES OF A VEHICLE

(71) Applicant: Ford Global Technologies, LLC, Dearborn, MI (US)

(72) Inventors: Thomas Edward Pilluti, Ann Arbor, MI (US); Shane Elwart, Ypsilanti, MI (US); Aaron L. Mills, Ann Arbor, MI (US); John Shutko, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/400,917

(22) Filed: Jan. 6, 2017

(65) Prior Publication Data

US 2018/0196428 A1 Jul. 12, 2018

(51) Int. Cl.
*G05D 1/00* (2006.01)
*B60W 30/18* (2012.01)
*B60W 40/08* (2012.01)
*B60W 50/08* (2012.01)

(52) U.S. Cl.
CPC ........... *G05D 1/0088* (2013.01); *B60W 30/18* (2013.01); *B60W 40/08* (2013.01); *B60W 50/08* (2013.01); *B60W 2040/0809* (2013.01); *B60W 2520/00* (2013.01); *B60W 2710/30* (2013.01)

(58) Field of Classification Search
CPC ...... B60W 30/18; B60W 40/08; B60W 50/08; B60W 40/09; B60W 2520/00; B60W 2710/30; B60W 30/06–30/17; B60W 2040/0809–2040/089; G05D 1/0088
See application file for complete search history.

(56) References Cited

U.S. PATENT DOCUMENTS

| 7,382,240 B2 | 6/2008 | Egelhaaf |
| 8,116,971 B2 | 2/2012 | Chen et al. |
| 8,232,873 B2 | 7/2012 | Sturm |

(Continued)

FOREIGN PATENT DOCUMENTS

| CN | 105931532 A | 9/2016 |
| GB | 2553677 A | 3/1918 |

(Continued)

OTHER PUBLICATIONS

Search Report dated Jun. 22, 2018 for GB Patent Application No. GB 1800128.9 (4 Pages).

*Primary Examiner* — Courtney D Heinle
(74) *Attorney, Agent, or Firm* — James P. Muraff; Neal, Gerber & Eisenberg LLP

(57) ABSTRACT

Method and apparatus are disclosed for a driver interactive system for semi-autonomous modes of a vehicle. An example disclosed vehicle with semiautonomous features includes memory and a processor. The example processor causes the vehicle to determine, with a driver identification sensor, the identity of a driver. The example processor also causes the vehicle to determine which semiautonomous features are flagged for training based on a driver profile of the identified driver. Additionally, the example processor causes the vehicle to, in response to the driver activating one of the flagged semiautonomous features, provide an audio-visual description of the semiautonomous feature.

13 Claims, 3 Drawing Sheets

(56) References Cited

U.S. PATENT DOCUMENTS

| | | | |
|---|---|---|---|
| 9,174,652 B2 | 11/2015 | Chang | |
| 2015/0070160 A1* | 3/2015 | Davidsson | B60W 50/14 |
| | | | 340/457 |
| 2015/0262484 A1* | 9/2015 | Victor | G09B 19/16 |
| | | | 701/1 |
| 2016/0314224 A1* | 10/2016 | Wei | G05B 17/02 |
| 2017/0039871 A1* | 2/2017 | Harkness | G09B 9/052 |
| 2017/0088143 A1* | 3/2017 | Goldman-Shenhar | |
| | | | B60K 35/00 |
| 2017/0240183 A1* | 8/2017 | Suzuki | B60W 40/08 |
| 2017/0345328 A1* | 11/2017 | Sherony | G09B 9/05 |
| 2017/0369072 A1* | 12/2017 | Huber | B60W 50/0098 |
| 2018/0001903 A1* | 1/2018 | Nagy | B60W 50/14 |

FOREIGN PATENT DOCUMENTS

| | | |
|---|---|---|
| WO | WO 2018022133 A1 | 2/1918 |
| WO | WO 2007090593 A1 | 8/2007 |

\* cited by examiner

DRIVER INTERACTIVE SYSTEM FOR SEMI-AUTONOMOUS MODES OF A VEHICLE

TECHNICAL FIELD

The present disclosure generally relates to semi-autonomous vehicles and, more specifically, a driver interactive system for semi-autonomous modes of a vehicle.

BACKGROUND

Increasingly, vehicles are becoming capable of assisting a driver in controlling the vehicle. These vehicles are sometimes referred to as semi-autonomous vehicles. The semi-autonomous vehicles have different features either that control some motive functions of the vehicle without direct driver input, or modify driver input to achieve a goal. The features of the semi-autonomous vehicles may include adaptive cruise control, lane centering, parking assistance, and highway assist. Some features control more of the vehicle than others. For example, the lane centering feature may adjust input from the driver to maintain the vehicle in the center of a lane and the highway assist feature may substantially control the motive functions of the vehicle while the vehicle in on a highway.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a driver interactive system for semi-autonomous modes of a vehicle. An example disclosed vehicle with semiautonomous features includes memory and a processor. The example processor causes the vehicle to determine, with a driver identification sensor, the identity of a driver. The example processor also causes the vehicle to determine which semiautonomous features are flagged for training based on a driver profile of the identified driver. Additionally, the example processor causes the vehicle to, in response to the driver activating one of the flagged semiautonomous features, provide an audiovisual description of the semiautonomous feature.

An example disclosed method includes determining the identity of a driver with a driver identification sensor. The example method also includes determining which semiautonomous features of a vehicle are flagged for training based on a driver profile of the identified driver. Additionally, the example method includes, in response to the driver activating one of the semiautonomous features that is flagged for training, providing, via an infotainment head unit, an audiovisual description of the activated semiautonomous feature.

An example tangible computer readable medium comprises instructions that, when executed cause, a vehicle to determine, using a driver identification sensor, the identity of a driver. The instructions also cause the vehicle to determine which semiautonomous features of a vehicle are flagged for training based on a driver profile of the identified driver. Additionally, the instructions cause the vehicle to, in response to the driver activating one of the semiautonomous features that is flagged for training, provide an audiovisual description of the activated semiautonomous feature via an infotainment head unit.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
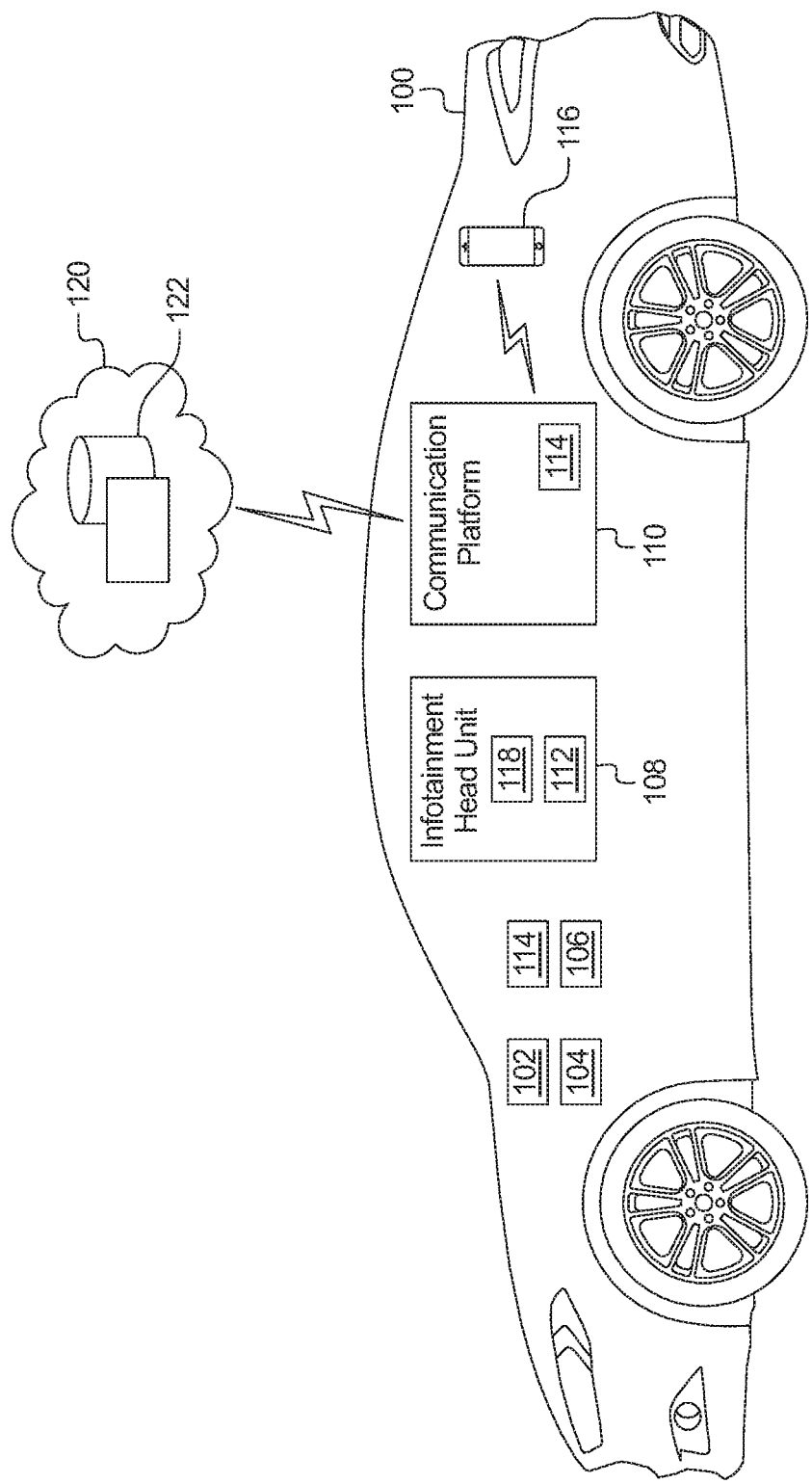
FIG. 1 illustrates a semi-autonomous vehicle with a driver interactive system operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As vehicles include more semi-autonomous features and become increasingly capable of assisting a driver in controlling the vehicle, it becomes increasingly difficult for the drivers to understand (a) the operation and of the semi-autonomous features, (b) the situations in which to use the semi-autonomous features, and (c) the limitations of the semi-autonomous features. For example, a highway assist feature may be designed to allow the driver to take his/her hands off of the wheel and pedals under certain circumstances. However, in such examples, the driver may need to be aware of the environment and be prepared to take control of the vehicle as needed. Before engaging some of the semi-autonomous features, the driver should be knowledgeable about the limitations of the feature and possible warnings and/or alerts that indicate to the driver the status of the feature.

As disclosed below, a feature tracker determines whether the driver is to receive training regarding a semi-autonomous feature. If the driver is to receive training, the feature tracker provides the training before the feature is activated. To accomplish this, the feature tracker detects when the driver enters the vehicle. The feature tracker then identifies the driver and retrieves a profile of the driver. When one of the semi-autonomous features is to be activated, the feature tracker determines, based on the profile, whether the driver is to receive training for the feature. In some examples, the driver is to receive training if the profile indicates that the driver has not used the feature before. Additionally, in some examples, the driver is to receive training if the feature tracker previously detected misuse of the feature. If the driver is to receive training for the feature, the feature tracker provides an audio and/or visual presentation. Subsequently, the feature tracker records in the profile that the driver has received training for the particular feature.

FIG. 1 illustrates a semi-autonomous vehicle 100 with a driver interactive system operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 is semi-autonomous. As used herein, a semi-autonomous vehicle is vehicle with features that control some motive functions (e.g., steering, braking, acceleration, etc.) of the vehicle without direct driver input. The features may have various levels of autonomous control. For example, the vehicle 100 may include a feature (e.g., a lane-centering feature) that autonomously corrects the position of the vehicle 100 with respect to the width of a lane by providing a counter-steering force when the vehicle 100 detects it is deviating from the lane. As another example, the vehicle 100 may include a highway assist feature that substantially controls the motive functions of the vehicle 100 while the vehicle 100 is traversing a controlled-access highway. In the illustrated example the vehicle 100 includes electronic control units (ECUs) 102, sensors 104, an autonomy unit 106, an infotainment head unit 108, a communications platform 110, and a feature tracker 112.

The ECUs 102 monitor and control the subsystems of the vehicle 100. The ECUs 102 communicate and exchange information via a vehicle data bus (e.g., the vehicle data bus 202 of FIG. 2 below). Additionally, the ECUs 102 may communicate properties (such as, status of the ECU 102, sensor readings, control state, error and diagnostic codes, etc.) to and/or receive requests from other ECUs 102. Some vehicles 100 may have seventy or more ECUs 102 located in various locations around the vehicle 100 communicatively coupled by the vehicle data bus 202. The ECUs 102 are discrete sets of electronics that include their own circuit(s) (such as integrated circuits, microprocessors, memory, storage, etc.) and firmware, sensors, actuators, and/or mounting hardware. The vehicle 100 includes the ECUs 102 may that control and/or monitor the motive functions of the vehicle 100, such as a powertrain control unit, a steering control unit, a braking control unit, and/or a body control unit, etc.

The sensors 104 may be arranged in and around the vehicle 100 in any suitable fashion. The sensors 104 may be mounted to measure properties around the exterior of the vehicle 100. For example, the sensors 104 may include range detection sensors (e.g., RADAR, LiDAR, ultrasonic sensors, infrared sensors, cameras, etc.) to detect objects (e.g., vehicles, infrastructure, road markers, pedestrians, etc.) in proximity to the vehicle 100. Additionally, some sensors 104 may be mounted inside the cabin of the vehicle 100 or in the body of the vehicle 100 (such as, the engine compartment, the wheel wells, etc.) to measure properties in the interior of the vehicle 100. For example, such sensors 104 may include accelerometers, odometers, tachometers, pitch and yaw sensors, wheel speed sensors, microphones, and/or tire pressure sensors, etc. In the illustrated example, the sensors 104 include one or more driver identification sensors 114. The driver identification sensors 114 determine an identity of the driver based on characteristics of the driver and/or a mobile device 116 (e.g., a phone, a smart watch, a key fob, etc.) carried by the driver. In some examples, the driver identification sensors 114 include a biometric sensor (e.g., a thumbprint scanner, a camera with facial and/or iris recognition, a weight sensor, a microphone with voice recognition, etc.), a personal area network controller (e.g., a Bluetooth® controller, a Bluetooth® Low Energy controller, etc to retrieve the identity of the driver from the mobile device 116, and/or a receiver transmitter module for a remote keyless entry system to retrieve a unique identifier from the key fob.

The autonomy unit 106 includes hardware (e.g., processor(s), memory, communication modules, etc.) and software to implement the semi-autonomous features of the vehicle 100. The autonomy unit 106 uses information from the sensors 104 to control ECUs 102 depending on the activated semi-autonomous feature. The semi-autonomous features may include, for example, adaptive cruise control, cooperative cruise control, parking assist, and/or highway assist, etc. In some examples, the autonomy unit 106 uses the sensors 104 to monitor the driver to determine whether the driver is complying with requirements and/or limitations on the semi-autonomous features. For example, the steering wheel of the vehicle 100 may include a grip sensor to detect when the hands of the driver are on the steering wheel. In such an example, the autonomy unit 106 may require the driver grip the steering wheel periodically when the highway assist feature is activated. In that example, the autonomy unit 106 may determine the driver is not complying with the requirements if the driver does not grip the steering wheel as required by the highway assist feature.

The infotainment head unit 108 provides an interface between the vehicle 100 and a user. The infotainment head unit 108 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), a digital dashboard display (e.g., an LCD display, an OLED display, etc.) and/or speakers. In the illustrated example, the infotainment head unit 108 includes hardware (e.g., a processor or controller, memory, storage, etc.) and software (e.g., an operating system, etc.) for an infotainment system 118 (such as SYNC® and MyFord Touch® by Ford®, Entune® by Toyota®, IntelliLink® by GMC®, etc.). Additionally, the infotainment head unit 108 displays the infotainment system 118 on, for example, the center console display.

The infotainment head unit 108 presents training to the driver via (a) the infotainment system 118 on the center console display, (b) the heads up display, (c) the dashboard display, and/or (d) the speakers. For example, the training may include an audio and/or visual presentation played on the sound system and/or displayed on the center console display. In some examples, the training for the semi-autonomous features has different levels (e.g., a first level, a second level, etc.) that are presented depending on whether the vehicle 100 is stopped with the transmission shifted into park. For example, a first level of training may include an audio presentation to be presented when the vehicle 100 is in motion. In another example, a second level of training may include an interactive audiovisual presentation that provides examples of alerts and visual indicators when the selected semi-autonomous feature requires attention for when the vehicle 100 is parked. To view the training for a particular feature, the driver may select the training via the infotainment system 118 to view the second level of training.

The communications platform 110 includes wired or wireless network interfaces to enable communication with an external network 120. The communications platform 110 also includes hardware (e.g., processors, memory, storage, antenna, etc.) and software to control the wired or wireless network interfaces. In the illustrated example, the communications platform 110 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); local area wireless network (including IEEE 802.11 a/b/g/n/ac or others), and Wireless Gigabit (IEEE 802.11ad), etc.). In some examples, the communications platform 110 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the vehicle 100 may communicate with the external network 120 via the coupled mobile device. The external network(s) 120 may be a public network, such as the Internet; a private network, such as an intranet; or combinations thereof, and may utilize a variety of networking protocols now available or later developed including, but not limited to, TCP/IP-based networking protocols. In the illustrated example, the external network includes a profile server 122 that stores profiles of drivers.

The feature tracker 112 determines whether to present training to the driver when the driver initiates one of the semi-autonomous features of the vehicle 100. The feature tracker 112, via the driver identification sensors 114, detects the identity of the driver when the driver is approaching the vehicle 100 and/or occupying the driver's seat. In some examples, the feature tracker 112 identifies the driver via (a) facial recognition, (b) voice recognition, (c) iris recognition, (d) a finger print scanner (e.g., on an ignition start button of the vehicle 100), (e) a unique identifier associated with the mobile device 116, (f) credential entered into the infotainment system 118, and/or (g) a weight sensor, etc.

When the driver is identified, the feature tracker 112 retrieves a profile associated with the driver. The profile tracks which autonomous features the driver has received the training about. In some examples, the profile is stored in memory (e.g., the memory 206 of FIG. 2 below) of the vehicle 100. Additionally or alternatively, in some examples, the feature tracker 112 retrieves from the mobile device 116 via the communications platform 110. Alternatively or additionally, the feature tracker 112 retrieves, via the communications platform 110, the profile from the profile server 122 hosted on the external network 120. The profile may be additionally used to store driver preferences for vehicle settings (e.g., radio station presets, seat and/or mirror positions, temperature settings, etc.).

The feature tracker 112 monitors for activation of one of the semi-autonomous features. In some examples, the autonomy unit 106 broadcasts a message on the vehicle data bus when one of the semi-autonomous features is activated. When one of the semi-autonomous features is activated, the feature tracker 112 determines, based on the profile, whether the driver is to receive training on the activated semi-autonomous feature. The driver is to receive training when, according to the profile, the driver either (a) has not received the training before or (b) the autonomy unit 106 has detected misuse of the activate semi-autonomous feature since the last time the training was presented. In some examples, the feature tracker 112 permits the driver to skip the training. In some such examples, after skipping the training a threshold number of times, the feature tracker 112 does not permit the driver to skip the training. In some such examples, the feature tracker 112 instructs the autonomy unit 106 not to activate the semi-autonomous feature until the training has been presented to the driver. Alternatively or additionally, in some examples, the feature tracker 112 determines, after the training has been skipped, whether the semi-autonomous feature corresponding to the skipped training is subsequently misused by the driver. In such examples, if the semi-autonomous feature is not misused, the feature tracker annotates the profile of the driver to not prompt for training in the future unless the semi-autonomous feature is afterwards misused. In examples, when the semi-autonomous feature is misused, the feature tracker 112 disables the skip function and prevents the semi-autonomous feature from begin activated until the driver receives the training. After the training is complete, the feature tracker 112 does not present the training again until either (a) the autonomy unit 106 has detected misuse of the activated semi-autonomous feature since the last time the training was presented or (b) the driver requests to the training to be presented.

The training includes an audio and/or visual presentation (sometime referred to as the "first level of training") that includes (a) the proper usage of the corresponding semi-autonomous feature, (b) required actions of the driver while the corresponding semi-autonomous feature is in use, and/or (c) the limitations of the corresponding semi-autonomous feature. In some examples, the first level of training is activated when the feature tracker 112 determines that the driver is to receive training. In some examples, feature tracker 112 includes the second level of training. The second level of training is presented when (i) the driver selects the training (e.g., via the input devices of the infotainment head unit 108) of one of the semi-autonomous features and (ii) the vehicle 100 is not in motion (e.g., the transmission of the vehicle 100 is shifted into park, etc.). The second level of training includes the audio and/or visual presentation of the first level of training, interactive presentation(s) via the touch screen of the infotainment head unit 108, and/or examples of alerts (e.g., audible alerts, etc.) and indicators (e.g., on the center console display, in the dashboard display, on the dashboard indicators, etc.) that the driver may experience during operation of the semi-autonomous feature. In some such examples, when the vehicle 100 includes a heads up display, the training includes a visual demonstration of the semi-autonomous feature on the heads up display.

In some examples, the feature tracker 112 limits or prevents activation of one of the semi-autonomous features if the driver, as indicated by the corresponding profile, (a) has not received training on the semi-autonomous feature or (b) the semi-autonomous feature has been flagged (e.g., because of misuse) to be retrained. In some examples, when the feature tracker 112 is unable to identify the driver (e.g., a profile cannot be retrieved using the data from the driver identification sensors 114, etc.), the feature tracker 112 acts like the driver does not have experience with any of the semi-autonomous features of the vehicle 100. Alternatively, in some examples, when the feature tracker 112 is unable to identify the driver (e.g., a profile cannot be retrieved using the data from the driver identification sensors 114, etc.), the feature tracker 112 (*a*) enables the semi-autonomous features, (b) monitors the use of the semi-autonomous features for misuse, and (c) disables the semi-autonomous features for which misuse is detected until the driver receives the training.

Figure 2:
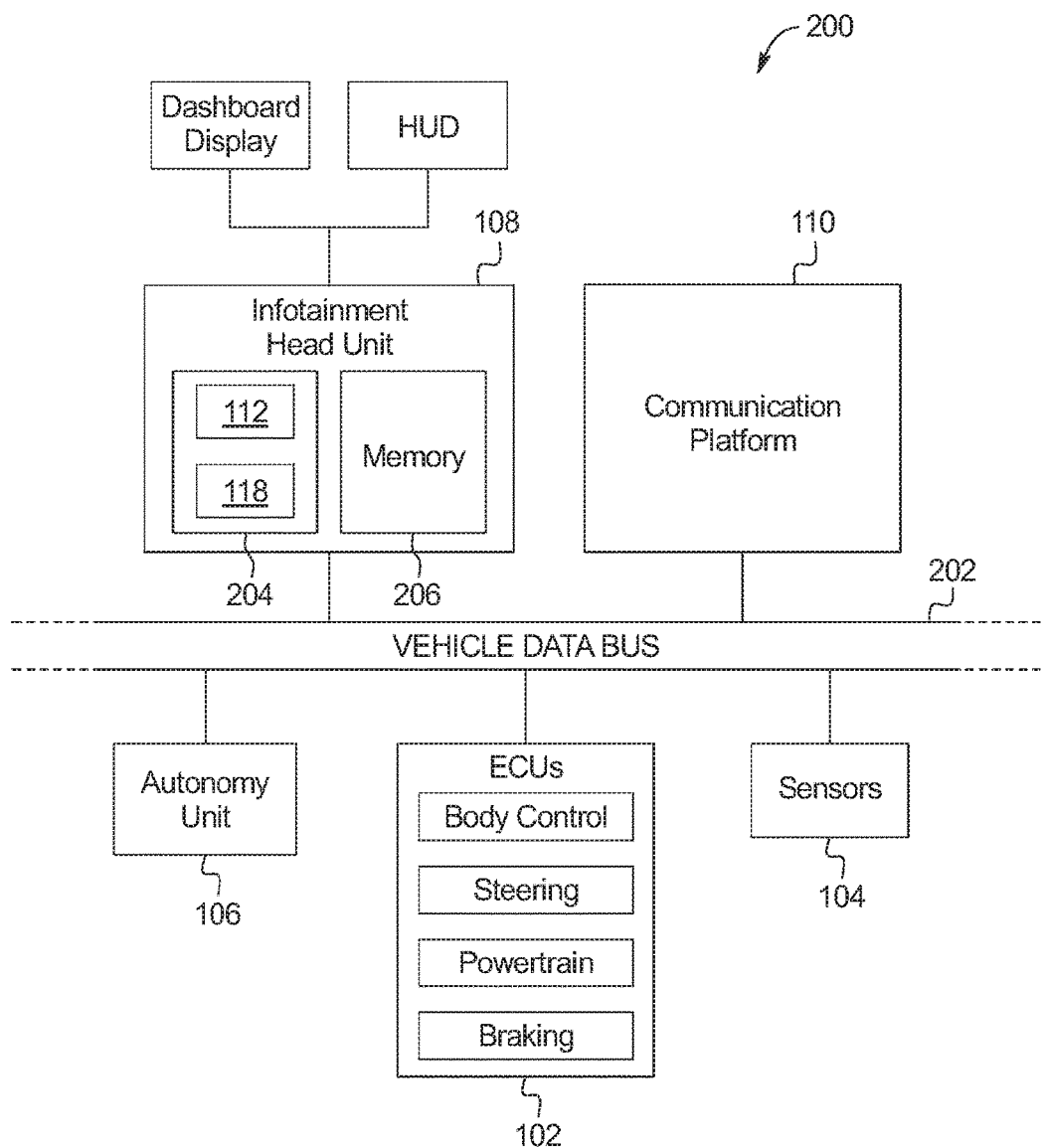
FIG. 2 is a block diagram of electronic components of the semi-autonomous vehicle of FIG. 1.

FIG. 2 is a block diagram of electronic components 200 of the semi-autonomous vehicle 100 of FIG. 1. In the illustrated example, the electronic components 200 include the example ECUs 102, the example sensors 104, the example infotainment head unit 108, the example communications platform 110, and an example vehicle data bus 202.

The example infotainment head unit 108 includes a processor or controller 204 and memory 206. In the illustrated example, the infotainment head unit 108 is structured to include feature tracker 112. Alternatively, in some examples, the feature tracker 112 may be incorporated into another device with its own processor and memory, such as one of the ECU(s) 102 or the autonomy unit 106. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 206 includes multiple kinds of memory, particularly volatile memory and non-volatile memory. In some examples, the profiles of the driver of the vehicle 100 are stored in the memory 206. In some examples, the training material (e.g., the audio files, the video files, the interactive files, etc.) are stored in the memory 206. In some such examples, from time-to-time, the training material stored in the memory 206 is updated from a server (e.g., the server 122, etc.) communicatively coupled to the external network 120.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The vehicle data bus 202 communicatively couples the ECUs 102, the sensors 104, the infotainment head unit 108, and/or the communications platform 110. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
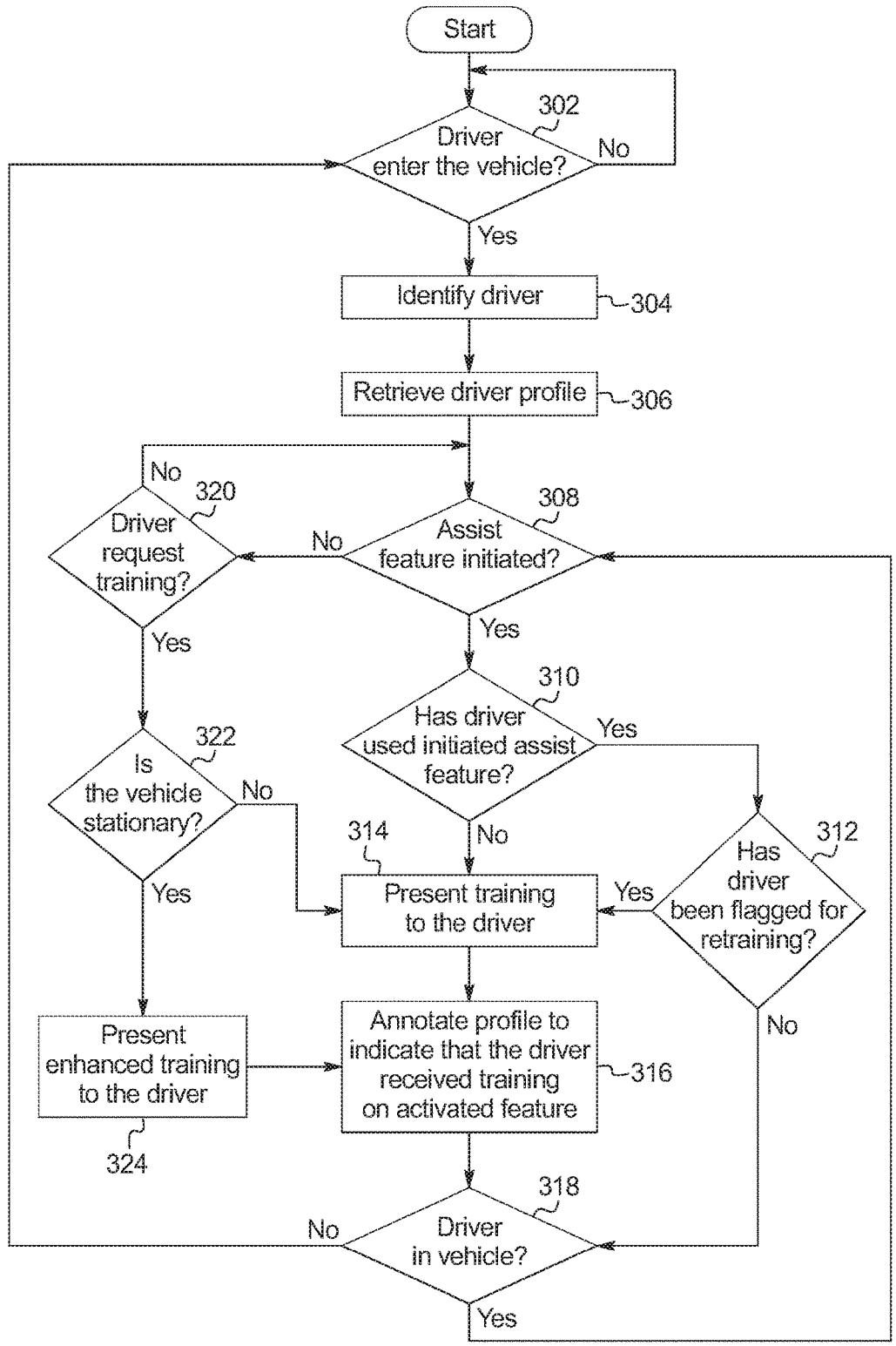
FIG. 3 is a flowchart of a method to provide an interactive system for semi-autonomous modes of the vehicle, which may be implemented by the electronic components of FIG. 2.

FIG. 3 is a flowchart of a method to provide an interactive system for semi-autonomous modes of the vehicle 100, which may be implemented by the electronic components 200 of FIG. 2. Initially, at block 302, the feature tracker 112 waits until a driver enters the vehicle 100. At block 304, the feature tracker 112 identifies the driver via the driver identification sensors 114. In some examples, the feature tracker 112 identifies the driver via (a) facial recognition, (b) voice recognition, (c) iris recognition, (d) a finger print scanner (e.g., on an ignition start button of the vehicle 100), (e) a unique identifier associated with the mobile device 116, (f) credential entered into the infotainment system 118, and/or (g) a weight sensor, etc. At block 306, the feature tracker 112 retrieves the profile of the driver identified at block 304. In some examples, the profile is stored in the memory 206 of the vehicle 100. Alternatively or additionally, in some examples, the feature tracker 112 retrieves the profile from the mobile device 116 and/or the profile server 122 via the communications platform 110.

At block 308, the feature tracker 112 determines whether one of the semi-autonomous features has been activated. In some examples, the autonomy unit 106 transmits a message via the vehicle data bus 202 when one of the semi-autonomous features has been activated. If one of the semi-autonomous features has been activated, the method continues at block 310, otherwise, if one of the semi-autonomous features has not been activated, the method continues at block 320. At block 310, the feature tracker 112 determines whether the driver has used the activated semi-autonomous feature before based on the profile retrieved at block 306. If the driver has used the activated semi-autonomous feature before, the method continues to block 312. Otherwise, if the driver has not used the activated semi-autonomous feature before, the method continues at block 314.

At block 312, the feature tracker 112 determines whether the driver has been flagged for retraining on the activated semi-autonomous feature based on the profile retrieved at block 306. In some examples, the feature tracker 112 flags a profile for retraining on the particular semi-autonomous feature when the autonomy unit 106 detects misuse of the semi-autonomous feature. For example, the autonomy unit 106 may detect misuse when the driver tries to activate adaptive cruise control on a surface street (e.g., a non-controlled-access roadway). If the driver has been flagged for retraining, the method continues at block 314. Otherwise, if the driver has not been flagged for retraining, the method continues at block 318.

At block 314, the feature tracker 112 presents a first level of training to the driver. The first level of training includes an audio presentation with information about (a) the operation and of the activated semi-autonomous feature, (b) the situations in which to use the activated semi-autonomous feature, and (c) the limitations of the activated semi-autonomous feature. At block 316, the feature tracker 112 annotates the profile to indicate that the driver has received training on the activated semi-autonomous feature. At block 318, the feature tracker 112 determines whether the driver is in the vehicle 100. If the driver is in the vehicle 100, the method returns to block 308. Otherwise, if the driver is not in the vehicle 100, the method returns to block 302.

At block 320, the feature tracker 112 determines whether the driver has requested the training on a particular one of the semi-autonomous features. If the driver has requested the training on a particular one of the semi-autonomous features, the method continues at block 322. Otherwise, if the driver did not request the training on a particular one of the semi-autonomous features, the method returns to block 308. At block 322, the feature tracker 112 determines if the vehicle 100 is stationary. In some examples, the feature tracker 112 determines whether the transmission of the vehicle 100 is shifted into park. If the vehicle is stationary, the method continues to block 324. If the vehicle is not stationary, the method continues to block 314 to present the first level of training to the driver. At block 324, the feature tracker 112 presents a second level of training to the driver. In some examples, the second level of training includes an audio and/or visual presentation, a demonstration of alerts produced by the selected semi-autonomous feature, and/or a simulation of the use of the selected semi-autonomous feature. The method then continues to block 316 so that the feature tracker 112 annotates the profile to indicate that the driver has received training on the selected semi-autonomous feature.

The flowchart of FIG. 3 is representative of machine readable instructions stored in memory (such as the memory 206 of FIG. 2) that comprise one or more programs that, when executed by a processor (such as the processor 204 of FIG. 2), cause the vehicle 100 to implement the example feature tracker 112 of FIGS. 1 and 2. Further, although the example program(s) is/are described with reference to the flowchart illustrated in FIG. 3, many other methods of implementing the example feature tracker 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle with semiautonomous features comprising:
memory; and
a processor that, when executing instructions stored in the memory, causes the vehicle to:
determine, with a driver identification sensor, an identity of a driver;
determine which semiautonomous features are flagged for training based on a driver profile of the identified driver; and
in response to the driver activating one of the flagged semiautonomous features:
determine whether the vehicle is stationary;
in response to the vehicle not being stationary, provide a first version of an audiovisual description; and
in response to the vehicle being stationary, provide a second version of the audiovisual description.

2. The vehicle of claim 1, wherein the processor is to cause the vehicle to, after providing the audiovisual description of the semiautonomous feature, annotate the profile of the driver to indicate that the semiautonomous features is not flagged for training.

3. The vehicle of claim 1, wherein the first version of the audiovisual description includes a description of the semiautonomous feature, a usage of the semiautonomous feature, and limitations of the semiautonomous feature.

4. The vehicle of claim 1, wherein the second version of the audiovisual description includes the first version of the audiovisual description and a demonstration of alerts generated by the semiautonomous feature.

5. The vehicle of claim 1, wherein the processor is to, in response to receiving a message that one of the semiautonomous feature was misused by the driver, annotate the profile of the driver to indicate that the semiautonomous features is flagged for training.

6. The vehicle of claim 1, wherein the profile of the driver is stored in at least one of the memory, a mobile device associated with the driver, or a server hosted on an external network.

7. A method comprising:
determining, with a processor and a driver identification sensor, an identity of a driver;
determining, with the processor, which semiautonomous features of a vehicle are flagged for training based on a driver profile of the identified driver; and
in response to the driver activating one of the semiautonomous features that is flagged for training, providing, via an infotainment head unit, an audiovisual description of the activated semiautonomous feature, wherein providing the audiovisual description of the activated semiautonomous feature includes:
determining whether the vehicle is stationary;
in response to the vehicle not being stationary, providing a first version of the audiovisual description; and
in response to the vehicle being stationary, providing a second version of the audiovisual description.

8. The method of claim 7, including, after providing the audiovisual description of the semiautonomous feature, annotating the profile of the driver to indicate that the semiautonomous features is not flagged for training.

9. The method of claim 8, wherein the first version of the audiovisual description includes a description of the semiautonomous feature, a usage of the semiautonomous feature, and limitations of the semiautonomous feature.

10. The method of claim 8, wherein the second version of the audiovisual description includes the first version of the audiovisual description and a demonstration of alerts generated by the semiautonomous feature.

11. The method of claim 7, including, in response to receiving a message that one of the semiautonomous feature was misused by the driver, annotating the profile of the driver to indicate that the semiautonomous features is flagged for training.

12. The method of claim 7, wherein the profile of the driver is stored in at least one of memory of the vehicle, a mobile device associated with the driver, or a server hosted on an external network.

13. A method comprising:
identifying, with a driver identification sensor, a driver;
determining, with a processor, which semiautonomous features of a vehicle are flagged for training in a driver profile of the identified driver; and
after the driver activates a semiautonomous feature that is flagged for training:
when the vehicle is moving, providing a first version of an audiovisual description; and
when the vehicle is stationary, providing a second version of the audiovisual description.

\* \* \* \* \*